(12) United States Patent
Bavunoglu et al.

(10) Patent No.: US 10,319,257 B2
(45) Date of Patent: Jun. 11, 2019

(54) SYSTEM OF CONVERTING HAND AND FINGER MOVEMENTS INTO TEXT AND AUDIO

(71) Applicants: Harun Bavunoglu, Izmir (TR); Elif Saygi Bavunoglu, Izmir (TR)

(72) Inventors: Harun Bavunoglu, Izmir (TR); Elif Saygi Bavunoglu, Izmir (TR)

( * ) Notice: Subject to any disclaimer, the term of this patent is extended or adjusted under 35 U.S.C. 154(b) by 258 days.

(21) Appl. No.: 15/034,875

(22) PCT Filed: Nov. 7, 2014

(86) PCT No.: PCT/TR2014/000448
§ 371 (c)(1),
(2) Date: May 6, 2016

(87) PCT Pub. No.: WO2015/116008
PCT Pub. Date: Aug. 6, 2015

(65) Prior Publication Data
US 2016/0284236 A1    Sep. 29, 2016

(30) Foreign Application Priority Data
Nov. 7, 2013    (TR) .................................. 2013/12926

(51) Int. Cl.
*G06F 3/01* (2006.01)
*G06F 3/16* (2006.01)
*G09B 21/00* (2006.01)
*G09B 21/04* (2006.01)

(52) U.S. Cl.
CPC ............ *G09B 21/009* (2013.01); *G06F 3/014* (2013.01); *G06F 3/162* (2013.01); *G09B 21/00* (2013.01); *G09B 21/04* (2013.01); *G06F 3/017* (2013.01)

(58) Field of Classification Search
CPC ...... G09B 21/00; G09B 21/009; G09B 21/04; G06F 3/014; G06F 17/28; G06F 3/017
See application file for complete search history.

(56) References Cited

U.S. PATENT DOCUMENTS

| | | | | |
|---|---|---|---|---|
| 5,280,265 A * | 1/1994 | Kramer | ................ | A61B 5/6806 128/925 |
| 5,592,401 A * | 1/1997 | Kramer | .............. | A63B 69/3608 340/524 |
| 5,676,157 A * | 10/1997 | Kramer | .................. | A61B 5/103 600/595 |
| 6,325,768 B1 * | 12/2001 | Williams | ............. | A61B 5/1071 600/595 |

(Continued)

FOREIGN PATENT DOCUMENTS

| | | |
|---|---|---|
| CN | 101430603 A | 5/2009 |
| MX | PAa2003010271 | 6/2005 |

(Continued)

*Primary Examiner* — William H McCulloch, Jr.
(74) *Attorney, Agent, or Firm* — Gokalp Bayramoglu

(57) ABSTRACT

The invention subject of the application is related to a system which detects movements performed by the hand and converts them to text and/or audio and is comprised of a pair of gloves and at least one data processing module developed to convert sign language used by hearing/speech impaired individuals to spoken language and/or text or to convert hand gestures defined for a particular purpose to audio and/or text.

12 Claims, 3 Drawing Sheets

(56) References Cited

U.S. PATENT DOCUMENTS

| | | | |
|---|---|---|---|
| 6,564,144 B1* | 5/2003 | Cherveny | G06F 3/017 382/114 |
| 6,701,296 B1* | 3/2004 | Kramer | A61B 5/6806 370/545 |
| 7,565,295 B1* | 7/2009 | Hernandez-Rebollar | G06K 9/00355 382/182 |
| 7,737,942 B2* | 6/2010 | Bajramovic | G06F 1/163 345/156 |
| 7,862,522 B1* | 1/2011 | Barclay | G06F 3/014 414/2 |
| 9,069,385 B1* | 6/2015 | Lynch | G06F 3/017 |
| 9,417,693 B2* | 8/2016 | Seth | G06F 3/017 |
| 9,607,506 B1* | 3/2017 | Manning | G08C 17/02 |
| 9,846,482 B2* | 12/2017 | Seth | G06F 3/014 |
| 10,057,676 B2* | 8/2018 | Manning | H04R 1/1091 |
| 2001/0040550 A1* | 11/2001 | Vance | G06F 3/014 345/156 |
| 2002/0012014 A1* | 1/2002 | Mohri | G06F 3/014 715/863 |
| 2002/0152077 A1* | 10/2002 | Patterson | G06F 3/014 704/271 |
| 2003/0048312 A1* | 3/2003 | Zimmerman | A61B 5/1114 715/863 |
| 2003/0167119 A1* | 9/2003 | Cherveny | G06F 3/017 701/409 |
| 2009/0054067 A1* | 2/2009 | Gauthier | G06F 3/011 455/440 |
| 2009/0054077 A1* | 2/2009 | Gauthier | G06F 3/014 455/456.1 |
| 2009/0278798 A1* | 11/2009 | Kim | G06F 3/011 345/158 |
| 2010/0023314 A1* | 1/2010 | Hernandez-Rebollar | G06F 3/014 704/3 |
| 2016/0162022 A1* | 6/2016 | Seth | G06F 3/017 345/156 |
| 2016/0284236 A1* | 9/2016 | Bavunoglu | G09B 21/00 |

FOREIGN PATENT DOCUMENTS

| | | |
|---|---|---|
| MX | GTa2005000013 | 7/2007 |
| WO | WO9739340 A1 | 10/1997 |
| WO | WO9850839 A2 | 11/1998 |
| WO | WO2004114107 A1 | 12/2004 |

* cited by examiner

SYSTEM OF CONVERTING HAND AND FINGER MOVEMENTS INTO TEXT AND AUDIO

TECHNICAL FIELD

The invention subject of the application is related to a system which detects movements performed by the hand and converts them to text and/or audio and is comprised of a pair of gloves and at least one data processing module developed to convert sign language used by hearing/speech impaired individuals to spoken language and/or text or to convert hand gestures defined for a particular purpose to audio and/or text.

BACKGROUND

In the prior art, while glove applications which detect and covert hand movements to different signals, audio and text are known, these different applications have different technical problems associated with them.

These technical problems may be listed as the below:
l. Applications which consist of a single accelerometer on the hand or the wrist are unable to detect all of the finger movements.
m. Applications which contain only an accelerometer are unable to correctly detect hand movements.
n. Applications consisting of a single glove are unable to detect the simultaneous movement of both hands and the meaning of these simultaneous movements.
o. A majority of the applications do not possess a solution that can be used in the training/education of hand movements.
p. A majority of the applications do not possess a solution providing a waterproof glove.
q. Some of the applications are closed glove solutions which do not provide ease of use.
r. Applications wherein data transfer or display units are fixed to the glove possess difficulties in use.
s. Applications which do not include "flex sensors" or "optical sensors" on the fingers and "resistive touch sensors" within the fingers are unable to detect all of the finger movements.
t. Some applications are able to detect only particular sign languages.
u. Applications which do not include an accelerometer are unable to detect hand movements.
v. A majority of the applications do not include a graphical display.

The inventions of the patent documents listed below may be provided as examples of glove applications found in the prior art:
WO 2004/114107: The invention subject of this invention is subject to items a, b, e, f and g of the aforementioned technical problems.
US 2010/0023314: The invention subject of this invention is subject to items b, c, d, e, f, g, h, i and k of the aforementioned technical problems.
MXGT/a/2005/000013: The invention subject of this invention is subject to items c, d, e, f, g, j and k of the aforementioned technical problems.
MXPA/a/2003/010271: The invention subject of this invention is subject to items c, d, e, f, g, j and k of the aforementioned technical problems.
CN 101430603: The invention subject of this invention is subject to items a, b, c, d, e, f, g and k of the aforementioned technical problems.

SUMMARY

The invention subject of the application consists of a pair of gloves containing 2 flex sensors on each of the fingers to detect joint movements, 4 resistive touch sensors between the fingers, 6 IMU (accelerometer, magnetometer, gyroscope) modules, being 1 on each of the fingers and 1 on the hand, to detect the movement of the hand and fingers 3 dimensionally and a data processing module which operates an algorithm which processes the signals receives from the glove to convert the movement information to text and/or audio. By this means, all of the movements of the hand and the fingers are processed by sensor fusion algorithms and detected with a high level of accuracy.

The development of the system of the system subject of the invention aims to provide:
detection of simultaneous movement of both hands,
ability of the system of the invention to learn predefined signs by means of the use of a touchscreen display and interface,
obtaining a glove that can be used in all weather conditions,
obtaining a slim design glove wherein only the sensor areas are covered and the palm and fingertips are not covered in order to increase ease of use,
obtaining a system wherein the graphical display data processing module is designed as a separate unit in order the provide for the glove to be light and to provide the user a modular ease of use,
ability to carry the data processing module by fastening it to the arm, wrist, waist or leg,
ability to define and detect the sign language of any country and gestures formed of hand and finger movements,
loading of different signs and languages to the data processing module by means of a software,
obtaining a data processing module that is able to self-learn,
obtaining a system that includes a touchscreen display to provide for the user to configure the data processing module, to change the mode and to enable tracking of the detected signs in text and simultaneously.

BRIEF DESCRIPTION OF THE DRAWINGS

The figures prepared in order to provide a better understanding of the system developed via the invention converting hand and finger movements to text and audio are described below.

DEFINITIONS OF THE COMPONENTS/SECTIONS/PARTS THAT FORM THE INVENTION

Figure 1:
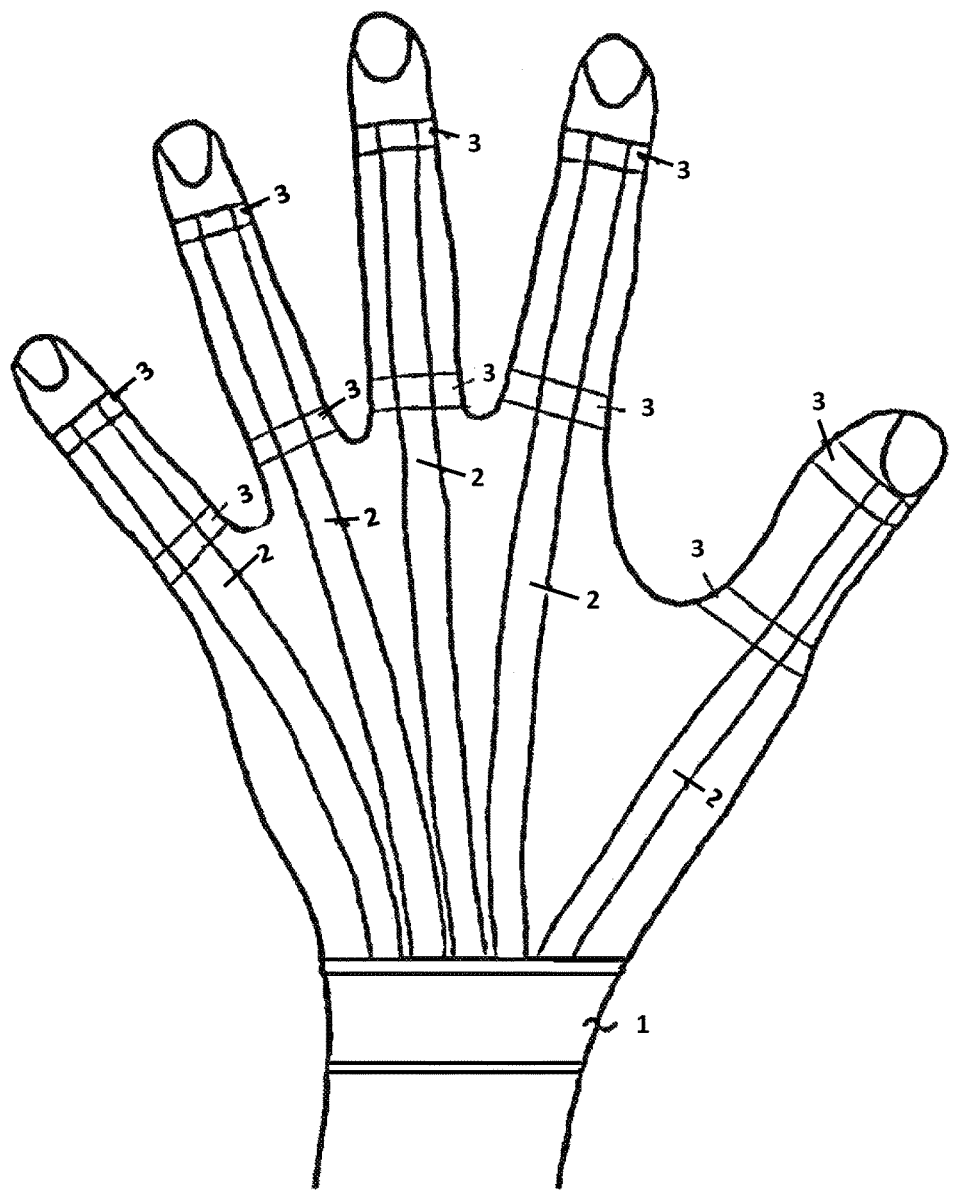
FIG. 1—General view of the glove of the invention.
Figure 2:
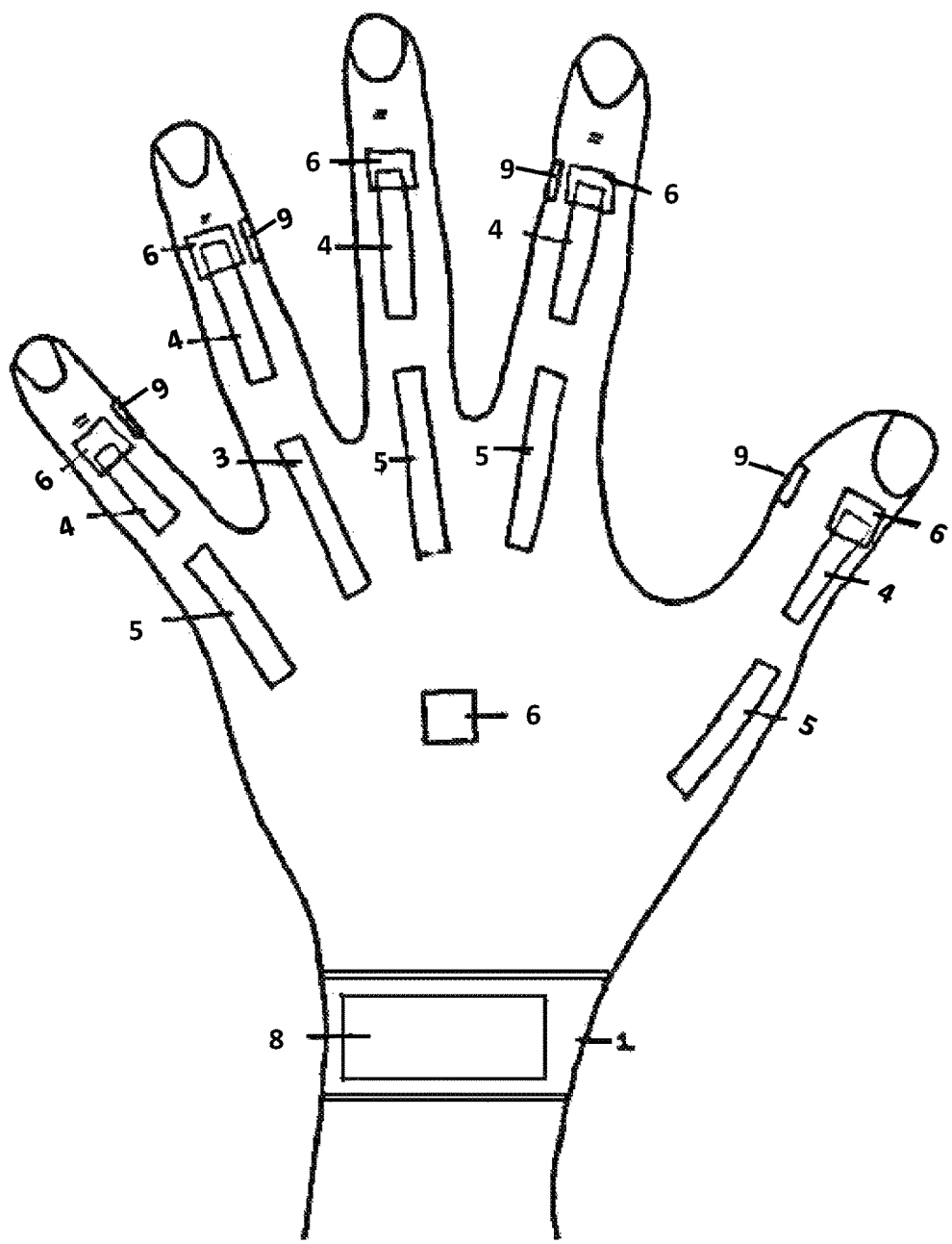
FIG. 2—General view of the sensor topography of the glove of the invention.
Figure 3:
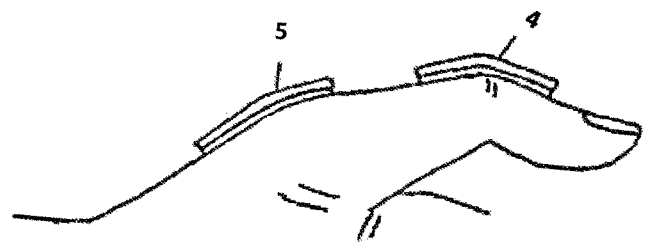
FIG. 3—Layout view of the flex sensor of the glove of the invention on the thumb.
Figure 4:
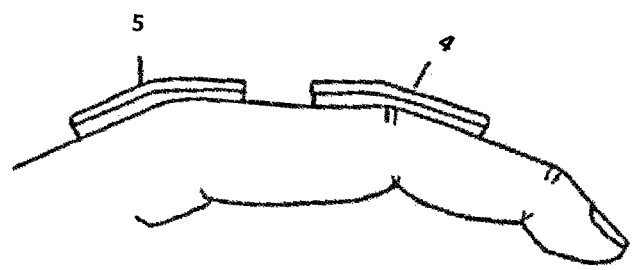
FIG. 4—Layout view of the flex sensor of the glove of the invention on the other fingers.
Figure 5:
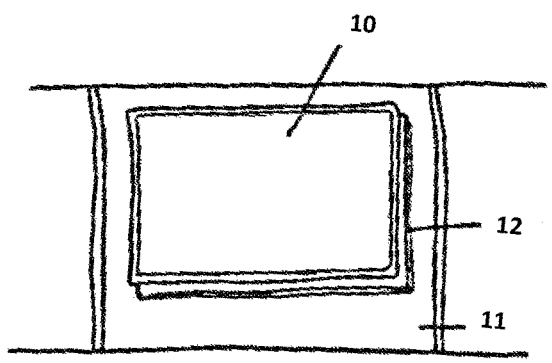
FIG. 5—General view of the data processing module shaped as a wrist band.

The components/sections/parts found in the figures prepared in order to provide a better understanding of the system developed via the invention converting hand and finger movements to text and audio have been separately numbered as specified below.
7. Wrist strap
8. Sensor channels
9. Glove fastening straps
10. MCP (Metacarpophalangeal) flex sensor
11. PIP (Proximal Interphalangeal) flex sensor
12. IMU (Inertial Measurement Unit)
9. Control card
12. Resistive touch sensor
13. Touchscreen
14. Data processing module fastening strap
13. Data processing module

DETAILED DESCRIPTION

In its basic application, the system of the invention for converting hand and finger gestures to text and audio is comprised of two gloves, each consisting of
At least 5 MCP flex sensors (4),
At least 5 PIP flex sensors,
At least 6 inertial measurement units (IMU) consisting of an accelerometer, magnetometer and gyroscope,
At least 4 resistive touch sensors (9),
One sensor channel (2) for each finger that holds all of the sensors (4, 5, 6 and 9) and the sensor connection cables together, that protects the sensors from liquids, dust, and similar external factors and that forms the skeletal structure of the glove and
Two glove fastening straps (3) per finger that secure the sensor channels (2) to the fingertips,
and
At least one control card (8) for each glove that collects the movement data received from the sensors (4, 5, 6 and 9) and transmits them to the data processing module (12) by means of wireless connection,
One data processing module (12) that operates the algorithm that enables the data received from the control cards (8) to be processed to be converted into audio and/or text and which includes a touchscreen that displays the user interface and all other system data and
One data processing module fastening strap (11) that enables the data processing module (12) to be fastened to the arm in the basic application of the invention.
In the basic application of the invention;
The wrist strap (1) is adjustable to wrists of all sizes as it is in the form of an adjustable strap and is manufactured of insulated flexible material so as to protect the control card (8) from external factors.
The sensor channels (2) are manufactured of insulated flexible material so as to protect the all of the sensors (4, 5, 6 and 9) and the sensor connection cables from external factors.
As the skeletal structure of the glove is formed of the sensor channels (2) and the glove fastening straps (3), it contains a half-open glove structure and thus does not restrict the user's ability to use his/her hands.
The MCP flex sensors (4) are placed on the top of each of the fingers, the PIP flex sensors (5) are placed on top of the hand to coincide with the PIP bones, 5 of the internal movement units (6) are placed on the edge of the fingertip side of each MCP sensor (4) and 1 is placed on top of the hand in a position to coincide with the central point and the resistive touch sensors (9) are placed next to the internal movement units (6) in the internal sections where each of the fingers but the middle finger are in contact with each other.
The system speaker which enables the movement converted to audio to be transmitted to the user in an audio environment is integrated to the data processing module (12).
The movement data converted into text is transmitted to the user via the touchscreen (10).
The basic application of the system of the invention consists of 3 basic modes of operation:
4. Operation mode: The raw sensor (4, 5, 6, and 9) data sent from the gloves are collected by the control card (8) and transmitted to the data processing module (12); the data collected by the module (12) are processed, the hand/finger movements are detected and the words corresponding to the detected signs are identified. If the words identified are being used for detecting a sign language, then they are arranged by being processed via natural language processing methods. The processed words/sentences are transmitted to the user simultaneously over the touchscreen (10) and/or over the speaker located on the data processing module (12) by being converted to audio signals. In other applications of the invention, it is possible for the processed words and data to be transmitted to different interfaces with the help of different components which can be added to the data processing module (12).
5. Training mode: The system of the invention can be used for trainings related to groups of signs or the sign language by means of the touchscreen (10) found on the data processing module (12). The system enables the user to learn the sign by directing the user with the help of videos and text showing the signs when it is switched to training mode via choosing buttons from the menu on the touchscreen (10). Moreover, this feature can also be used for the module (12) to self-calibrate according to the user and the performance of the detection of the signs is increased.
6. Learning mode: By switching the data processing module (12) to the learning mode, it is possible to assign particular meanings to particular signs. In this mode, the user is the directed by the touchscreen (10) to perform the signs correctly and incorrectly and it is provided for the module (12) to learn the sign by having the user enter the corresponding meaning of the sign using the touchscreen (10).

The invention claimed is:
1. A system for converting hand movements to a text or a speech, the system comprising:
two gloves each to wear on a hand and a data processing module;
wherein each glove comprises
at least five metacarpophalangeal (MCP) flex sensors;
at least five proximal interphalangeal (PIP) flex sensors;
at least six inertial measurement units, wherein each inertial measurement unit comprises an accelerometer, a magnetometer and a gyroscope;
at least four resistive touch sensors;
one sensor channel provided for each finger for holding one MCP flex sensor, one PIP flex sensor, one inertial measurement unit and connecting cables together, wherein the sensor channels form a skeleton of the glove;
two glove fastening straps for fastening the sensor channel to a corresponding finger; and a control card for collecting movement data received from the at least five MCP flex sensors, the at least five PIP flex sensors, the at least six inertial measurement units, and the at least five resistive touch sensors;

a wireless device for transmitting the movement data from control card to the data processing module;

wherein the data processing module processes the movement data and convert the movement data into at least one of the speech or the text;

the data processing module includes a touchscreen display for displaying a user interface.

2. The system according to claim 1, wherein the each hand glove further comprises a wrist strap, the sensor channels extend out from the wrist strap.

3. The system according to claim 2, wherein the wrist strap is manufactured of insulated flexible material so as to protect the control card from external factors.

4. The system according to claim 1, wherein the sensor channels are manufactured of insulated flexible material so as to protect the sensors and the sensor connection cables from external factors.

5. The system according to claim 1, wherein the skeletal structure of the glove formed of the sensor channels and the glove fastening straps form a half-open glove structure.

6. The system according to claim 1, wherein the at least five MCP flex sensors are placed on positions corresponding to top of each of the fingers.

7. The system according to claim 1, wherein the PIP flex sensors are placed on positions corresponding to a top of the hand to coincide with PIP bones.

8. The system according to claim 1, wherein five of the six inertial measurement units are placed on an edge of the fingertip side of each MCP sensor and one of the six inertial measurement units is placed on top of the hand in a position to coincide with a central point of the hand.

9. The system according to claim 1, wherein one resistive touch sensor is placed next to each of the six inertial measurement units in the internal sections where each of the fingers but the middle finger are in contact with each other.

10. The system according to claim 1, further comprising a speaker integrated with the data processing module to transmit the speech.

11. The system according to claim 1, wherein the text is displayed on the touchscreen display.

12. A system for converting hand movements to a text or a speech, the system comprising:
two gloves, and a data processing module;
wherein each glove comprises
at least five metacarpophalangeal (MCP) flex sensors;
at least five proximal interphalangeal (PIP) flex sensors;
at least six inertial measurement units, wherein each inertial measurement unit comprises an accelerometer, a magnetometer and a gyroscope;
at least four resistive touch sensors;
one sensor channel provided for each finger for holding one MCP flex sensor, one PIP flex sensor, one inertial measurement unit and connecting cables together, wherein the sensor channels form a skeleton of the glove;
two glove fastening straps for fastening the sensor channel to a corresponding finger; and
a control card for collecting movement data received from the at least five MCP flex sensors, the at least five PIP flex sensors, the at least six inertial measurement units, and the at least five resistive touch sensors;
a wireless device for transmitting the movement data from control card to the data processing module;
a wrist strap, the sensor channels extend out from the wrist strap;
wherein the at least five MCP flex sensors are placed on positions corresponding to top of each of the fingers;
wherein the PIP flex sensors are placed on positions corresponding to a top of the hand to coincide with PIP bones;
wherein five of the six inertial measurement units are placed on an edge of the fingertip side of each MCP sensor and one of the six inertial measurement units is placed on top of the hand in a position to coincide with a central point of the hand
wherein the data processing module processes the movement data and convert the movement data into at least one of the speech or the text;
the data processing module includes a touchscreen display for displaying a user interface.

* * * * *